United States Patent
Marosek

(10) Patent No.: US 7,321,203 B2
(45) Date of Patent: Jan. 22, 2008

(54) LED DIMMING CONTROL TECHNIQUE FOR INCREASING THE MAXIMUM PWM DIMMING RATIO AND AVOIDING LED FLICKER

(75) Inventor: Mark W. Marosek, Sunnyvale, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 11/373,266

(22) Filed: Mar. 13, 2006

(65) Prior Publication Data

US 2007/0210725 A1 Sep. 13, 2007

(51) Int. Cl.
*H05B 41/16* (2006.01)

(52) U.S. Cl. ............... 315/247; 315/246; 315/DIG. 4; 315/291; 315/209 R

(58) Field of Classification Search ........... 315/247, 315/246, 224, 225, 209 R, 200 R, DIG. 4, 315/291, 307
See application file for complete search history.

(56) References Cited

U.S. PATENT DOCUMENTS

| | | | |
|---|---|---|---|
| 6,624,593 B2* | 9/2003 | Blanchard | 315/209 R |
| 7,215,104 B2* | 5/2007 | Nakata et al. | 323/282 |
| 2004/0251854 A1 | 12/2004 | Matsuda et al. | |
| 2006/0138973 A1* | 6/2006 | Hirosawa | 315/291 |

FOREIGN PATENT DOCUMENTS

| | | |
|---|---|---|
| DE | 299 19 006 U 1 | 6/2000 |
| EP | 1 033 903 A2 | 9/2000 |
| WO | WO 2004/057921 A1 | 7/2004 |

OTHER PUBLICATIONS

International Search Report issued in corresponding International Application No. PCT/US2006/034337, dated Jan. 19, 2007.
Written Opinion of the International Searching Authority issued in corresponding International Application No. PCT/US2006/034337, dated Jan. 19, 2007.

* cited by examiner

*Primary Examiner*—Tuyet Vo
(74) *Attorney, Agent, or Firm*—McDermott Will & Emery LLP

(57) ABSTRACT

Circuitry and methodology for providing LED dimming control in a LED driving system having a switching regulator for providing power supply to drive the LED. The switching regulator includes a switching circuit to which an oscillation signal is applied to control switching of the switching circuit. A dimming control input is supplied with a pulse-width modulation (PWM) dimming control signal to provide PWM dimming control of the LED. The dimming control input applies the PWM dimming control signal to control switching of the switching circuit. A synchronizing circuit is provided for synchronizing the oscillation signal to the PWM dimming control signal.

14 Claims, 4 Drawing Sheets

BACKGROUND

BACKGROUND

LED DIMMING CONTROL TECHNIQUE FOR INCREASING THE MAXIMUM PWM DIMMING RATIO AND AVOIDING LED FLICKER

TECHNICAL FIELD

This disclosure relates to power supply systems, and more particularly, to light-emitting diode (LED) dimming control circuitry and methodology that allows a LED driver to increase the maximum pulse-width modulation (PWM) dimming ratio and avoid LED flicker.

BACKGROUND ART

LED dimming control may be utilized to provide control of LED brightness without changing LED color. For example, PWM dimming control uses a PWM signal to drive a LED. FIG. 1 illustrates the PWM dimming control signal, as well as inductor current in the LED driver and LED current controlled by the PWM input signal. The LED current may be programmed for maximum brightness and then "chopped" over a range of duty cycles to achieve a range of brightness levels. The PWM dimming control signal may be applied to the LED through a field effect transistor. When the PWM signal goes low, the LED may be turned off. When the PWM signal goes high, the LED current may return to its previous on state.

The PWM dimming ratio is inversely proportional to the duty cycle (D) of the PWM signal, i.e.

$$\text{PWM dimming ratio} = 1/D = T_{pwm}/T_{pwmON},$$

where $T_{pwm}$ is a period of the PWM signal, and $T_{pwmON}$ is PWM pulse width.

The maximum PWM dimming ratio may be calculated based on the maximum PWM period and the minimum PWM pulse width as follows:

$$\text{PWM maximum dimming ratio} = T_{pwmMAX}/T_{pwmON\_MIN},$$

where $T_{pwmMAX}$ is the maximum PWM period, and $T_{pwmON\_MIN}$ is the minimum PWM pulse width.

As illustrated in FIG. 2, conventional PWM dimming control is provided to enable LED driver operation during the on time of the PWM signal and disable LED driver operation during the off time of the PWM signal. A random delay time Td is created between the active edge of the PWM signal and the starting ramp of the inductor current representing the moment when the power switch driving the LED is turned on. After a time period Tr, the rising inductor current reaches its average value I(L) (ave).

For applications requiring a large range of brightness control, the maximum PWM dimming ratio must be made high. This requires the LED driver to be capable of responding to a very low duty cycle PWM signal. The LED driver must be able to switch from zero inductor current to maximum inductor current during the short time that the PWM input is active. However, the delay Td reduces time available for the LED driver to reach the maximum inductor current. Therefore, a reduced maximum PWM dimming ratio must be used to give the LED driver sufficient time to reach the maximum inductor current.

In addition, as discussed above, the delay time Td is random. The variation in the delay time Td results in the respective LED current variation which can be visible to the human eye as LED flicker.

Therefore, it would be desirable to create a novel PWM dimming control technique to increase the maximum PWM dimming ratio and avoid LED flicker.

SUMMARY OF THE DISCLOSURE

The present disclosure offers novel circuitry and methodology for providing LED dimming control. In accordance with one aspect of the disclosure, A LED driving system comprises a switching regulator for providing power supply to drive the LED. The switching regulator includes a switching circuit. An oscillator provides an oscillation signal to control switching of the switching circuit. A dimming control input is supplied with a pulse-width modulation (PWM) dimming control signal to provide dimming control of the LED. The dimming control input applies the PWM dimming control signal to control switching of the switching circuit. A synchronizing circuit is provided for synchronizing the oscillation signal to the PWM dimming control signal.

In particular, the synchronizing circuit may allow the switching circuit to be turned on in synchronization with an active edge of the PWM dimming control signal.

The switching circuit may be controlled by a latch having a control input controlled by the oscillator.

The switching regulator and the oscillator may be provided on a LED driver chip. The synchronizing circuit may be internal or external with respect to the LED driver chip.

In accordance with an exemplary embodiment of the disclosure, the synchronizing circuit may include a one-shot circuit controlled by the PWM dimming control signal. The one-shot circuit may produce an output signal for controlling the control input of the latch.

In accordance with another embodiment of the disclosure, the synchronizing circuit may hold the control input of the latch at a first level during an inactive portion of the PWM dimming control signal, and may allow the control input to go to a second level causing the switching circuit to quickly turn on in response to an active edge of the PWM dimming control signal.

In accordance with a further embodiment of the disclosure, an external synchronizing circuit may include a MOSFET and a capacitive element for applying the PWM signal to a timing resistor that supports operation of the oscillator.

In accordance with a method of the present disclosure, the following steps are carried out to provide LED dimming control using a PWM dimming control signal:

driving a LED using a switching circuit controlled by an oscillation signal, and synchronizing the oscillation signal to the PWM dimming control signal.

The switching circuit may be turned on in synchronization with an active edge of the PWM dimming control signal.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

Figure 1:
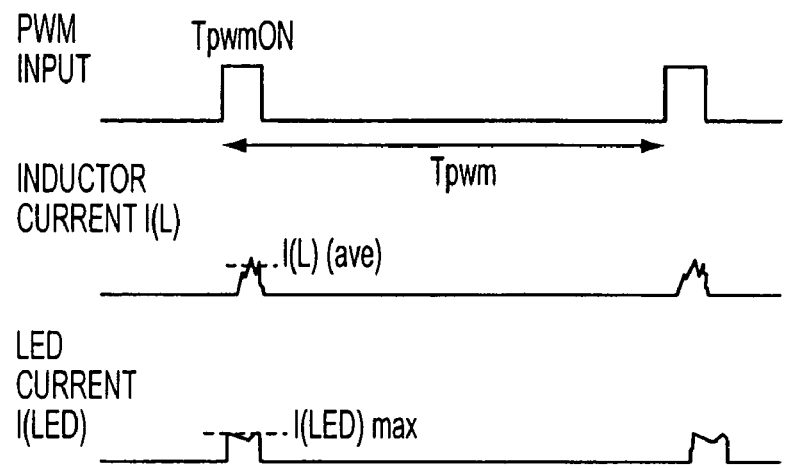
FIG. 1 shows waveforms illustrating PWM dimming control signal, as well as inductor current and LED current controlled by the PWM dimming control signal.
Figure 2:
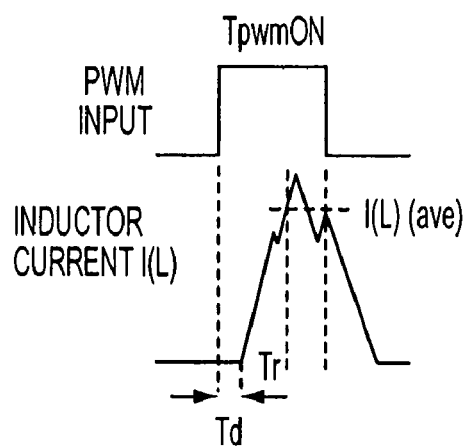
FIG. 2 shows waveforms illustrating conventional PWM dimming control.

The present disclosure will be made with the example of a LED driving circuit 10 shown in FIG. 3. It will become apparent, however, that the concepts described herein are applicable to any LED driver having a LED dimming control mechanism.

The LED driving circuit LED 10 may be provided on a chip having an input auxiliary circuit for supporting external LED dimming control. The input auxiliary circuit may include an operational amplifier 12 arranged in a negative feedback loop. A non-inverting input of the amplifier 12 is supplied with a reference voltage Vref1, while an inverting input is connected to a node Y. As discussed in more detail later, the node Y (if made external to the LED driving circuit) may be controlled by an external circuit in order to synchronize PWM active edge to the start of a new oscillator cycle. The output of the operational amplifier 12 drives the base of a bipolar transistor Q1 so as to create a voltage at the node Y connected to the emitter of Q1 equal to the voltage at the non-inverting input of the amplifier 12. Via a resistor R, the node Y is connected to the ground. The node Y may be external with respect to the LED driving circuit chip in order to allow an external circuit to control the node Y.

The collector of Q1 is connected to a current source 14 coupled to a capacitor C. The current $I_{Q1}=V_Y/R$, passing through the transistor Q1 defines the current produced by the current source 14 to charge the capacitor C, where $V_Y$ is the voltage at the input Y, and R is the resistance of the resistor R. The current source 14 and the capacitor C are arranged in a ramp oscillator circuit that produces a sawtooth oscillation signal at the node OSC between the current source 14 and the capacitor C.

The oscillation signal is supplied to an inverting input of a comparator 16. A non-inverting input of this comparator is supplied with a reference voltage Vref2. A node X is connected to the output of the comparator 16. As discussed in more detail later, the node X may be controlled by a variety of synchronization circuits internal to the LED driving circuit chip. The synchronization circuits may override the node X in order to synchronize oscillator reset and power control latch reset with every PWM active edge. As one skilled in the art will realize, the LED driving circuit chip of the present disclosure may support external PWM dimming synchronization control via the pin Y or internal PWM dimming synchronization control via the node X.

The output of the comparator 16 is also connected to an inverter 18 driving the base of a bipolar transistor Q2. When the voltage at the inverting input of the comparator 16 becomes greater than the reference voltage Vref2, the output of the comparator 16 goes to a low level. Therefore, the output of an inverter 18 coupled to the comparator 16 goes to a high level turning on the bipolar transistor Q2. When the transistor Q2 is on, it causes a sharp discharge of the capacitor C that pulls down the OSC node driving the inverting input of the comparator 16.

When the voltage at the inverting input of the comparator 16 drops below the reference voltage Vref2 at the non-inverting input, the output of the comparator 16 goes to a high level causing a low level at the output of the inverter 18. As a result, the transistor Q2 turns off to repeat the oscillation cycle.

The output of the inverter 18 is connected to a reset input R of an RS latch 20 controlling a power switch 22 of a switching regulator that provides power supply for one or multiple LEDs. As schematically shown in FIG. 3, the power switch 22 is coupled to a switching regulator output 24 that produces power supply for one or more LEDs 26.

As one skilled in the art will realize, the switching regulator is a DC/DC converter that may serve as a power supply for one or more LEDs 26. For example, the switching regulator may serve as a constant-current source for one or more LEDs 26. The LED dimming control of the present disclosure may be implemented with any type of switching regulator. In particular, the switching regulator for one or more LEDs 26 may have a buck, boost, buck-boost, flyback or single-ended primary inductance converter (SEPIC) configuration. The switching regulator may have an arrangement that provides multiple outputs to support multiple LEDs 26.

For example, in a buck configuration of the switching converter, the power switch 22 may alternately connect and disconnect the input voltage to and from an inductor of the switching regulator. In a boost or buck-boost configuration, the power switch 22 may cause increasing the inductor current in an on state, and decreasing the inductor current in an off state. In a flyback configuration of the switching regulator, the power switch 22 in an on state may force the input voltage across the primary winding of a transformer increasing flow of current through the winding. In an off state, the power switch 22 may decrease current flow in the primary winding. Details of switching regulator operations in any of these configurations are well known to those skilled in the art.

The power switch 22 is connected to the $\overline{Q}$ output of the latch 20. Following the oscillation signal at the OSC node, the signal at the R input of the latch 20 goes from a low level to a high level and back trying to continuously reset the latch 20. However, as discussed in more detail below, a high period of this signal is much shorter than the low period. When the latch is reset by a high level at the R input, the power switch 22 turns on. A bipolar transistor Q3 is connected in a feedback loop between the $\overline{Q}$ output of the latch 20 and the R input of this latch to hold off the power switch 22 until the reset of the latch 20 is complete.

The power switch 22 may be turned on in each oscillation cycle when the R input goes to a high level unless a control signal supplied to a set input S of the latch 20 prevents the power switch 22 from turning on in the next cycle. Also, this control signal may limit a duty cycle of the power switch 22. The control signal supplied to the S input may be produced by a loop control circuit 28 of the switching regulator to turn off the power switch 22. For example, in a current mode of the switching regulator, the control signal at the S input may define a current limit for the switch 22. If the current in the regulator reaches the current limit, the control signal is supplied to the S input to turn off the power switch 22.

PWM dimming control may be provided using a PWM input supplied by a PWM dimming control signal. Via an inverter 30, the PWM input may drive the base of a bipolar transistor Q4 having the collector connected to the $\overline{Q}$ output of the latch 20. When the PWM signal is at a low level, the inverter 30 drives the base of the transistor Q4 high causing the $\overline{Q}$ output to be a low level. As a result, no switching of the power switch 22 is allowed. When the PWM signal goes high, the inverter 30 drives the base of the Q4 low releasing the $\overline{Q}$ output to allow the R and S inputs of the latch 20 to control the $\overline{Q}$ output.

As discussed above, conventional PWM dimming control involves enabling LED driver operation (i.e. allowing switching of the power switch 22) during the on time of the PWM dimming control pulse and disabling LED driver operation (i.e. preventing the power switch 22 from switching) during the off time of the PWM dimming control pulse. For example, in accordance with a conventional asynchronous dimming control technique, the PWM dimming control signal may be applied to the $\overline{Q}$ output of the latch 20.

Figure 4:
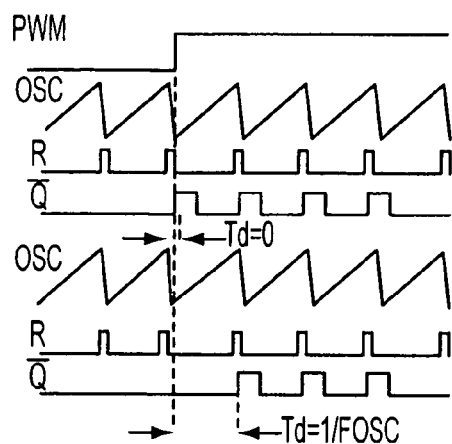
FIG. 4 shows waveforms illustrating asynchronous dimming control technique.

FIG. 4 illustrates two worst case scenarios for the timing of the oscillation signal at the node OSC and the PWM active edge in accordance with an asynchronous dimming control technique. Waveforms in FIG. 4 represent the timing relations between the PWM dimming control signal and signals at the node OSC, the R input of the latch 20 and the $\overline{Q}$ output of the latch 20. If the oscillation signal at the node OSC is at the end of its cycle and resets the latch 20 just as the PWM dimming control signal becomes active, then the power switch 22 turns on almost immediately, i.e. delay Td between the active edge of the PWM signal and the signal at the $\overline{Q}$ output (that turns on the switch 22) is equal to about zero. However, if the oscillation signal at the node OSC has just completed a cycle before the PWM signal becomes active, the LED driver must wait up to a full oscillation period before another reset pulse is applied to the R input of the latch 20. Therefore, the delay Td may approach 1/Fosc, where Fosc is the frequency of the oscillation signal at the node OSC. The variation of Td may cause visible LED flicker at high PWM dimming ratios.

Figure 5A:
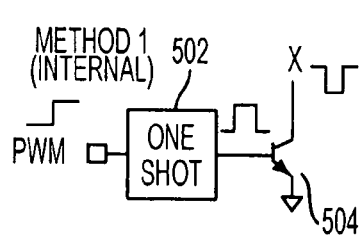
FIGS. 5A and 5B respectively show circuitry and waveforms illustrating a first exemplary embodiment of synchronous dimming control technique of the present disclosure.
Figure 5B:
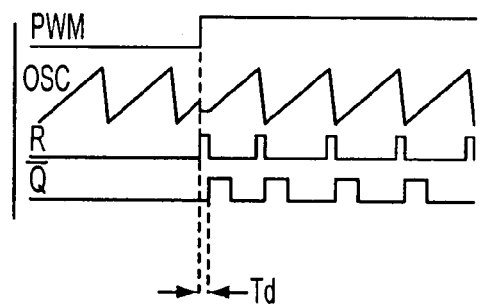
Figure 6A:
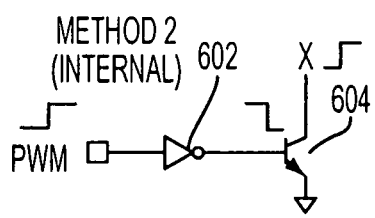
FIGS. 6A and 6B respectively show circuitry and waveforms illustrating a second exemplary embodiment of synchronous dimming control technique of the present disclosure.

To increase the maximum PWM dimming ratio and avoid LED flicker, the PWM dimming control technique of the present disclosure uses synchronization of the oscillation signal at the node OSC to the PWM dimming control signal. Therefore, the power switch 22 will be turned on in synchronization to the active edge of the PWM control signal to reduce the variation of the delay Td. Exemplary embodiments for implementing synchronization technique of the present disclosure are shown in FIGS. 5A, 6A and 7A. Operations of these embodiments are explained using the respective waveforms in FIGS. 5B, 6B and 7B that show timing relations between the PWM dimming control signal and the signals at the node OSC, the R input and the $\overline{Q}$ output.

Figure 3:
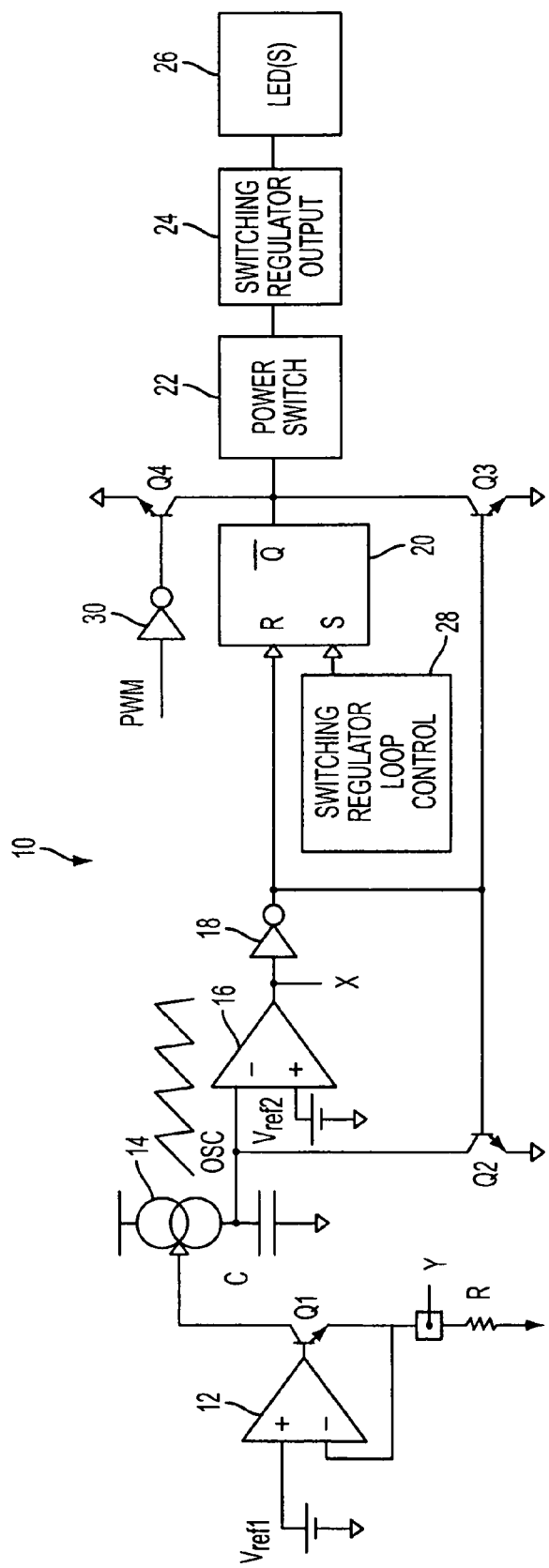
FIG. 3 shows an exemplary LED driving circuit of the present disclosure.

As shown in FIG. 5A, the circuit for synchronizing the oscillation signal to the PWM dimming control signal may include a one-shot circuit 502 driving the base of a bipolar transistor 504 having a collector coupled to the node X shown in FIG. 3. The one-shot circuit 502 and the transistor 504 may be provided inside the LED driving circuit control chip to support internal PWM dimming control for the LED driving circuit 10.

In response to the active edge of the PWM dimming control signal (FIG. 5B), the one-shot circuit 502 produces a one-shot pulse that resets the latch 20 and discharges the oscillator to a starting point and, thereafter, enables the power switch 22. As a result, the delay time Td between the active edge of the PWM signal and the signal at the $\overline{Q}$ output will be independent of the Fosc. The value of the delay time Td is defined by the duration of the one-shot signal. Therefore, variation of the Td will be minimal.

Referring to FIG. 6A that shows another exemplary embodiment of the present disclosure, the synchronizing circuit may include an inverter 602 supplied with the PWM dimming control signal. The output of the inverter 602 drives a base of a bipolar transistor 604 having a collector connected to the X node shown in FIG. 3. The inverter 602 and the transistor 604 may be provided inside the LED driving circuit control chip to provide internal PWM dimming control for the LED driving circuit 10.

Figure 6B:
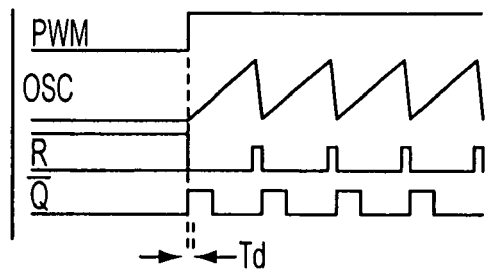
Figure 7A:
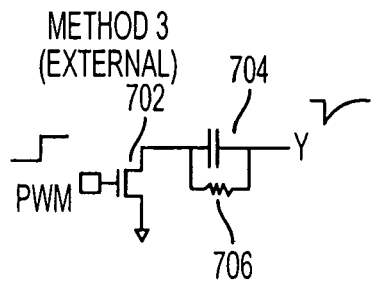
FIGS. 7A and 7B respectively show circuitry and waveforms illustrating a third exemplary embodiment of synchronous dimming control technique of the present disclosure.

As illustrated in FIG. 6B, the signal at the node X holds the R input of the latch 20 at a high level during the inactive period of the PWM signal. This, in turn, holds the oscillation signal at a low level at the starting point of a new oscillation cycle. In response to the active edge of the PWM signal, the transistor Q3 (FIG. 3) is turned off allowing the $\overline{Q}$ output to rise fast enough to reset the latch 20 and turn on the power switch 22. As a result, the delay Td will be defined by minimal propagation delays. Its variation will be insignificant.

Figure 7B:
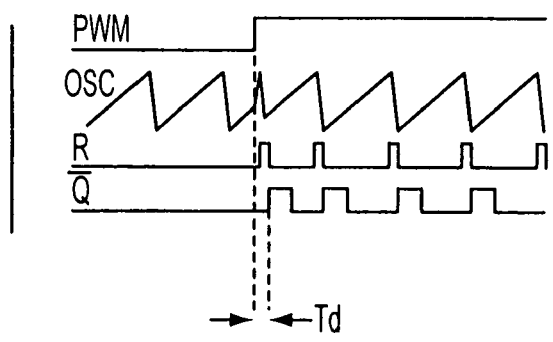
Figure 4:
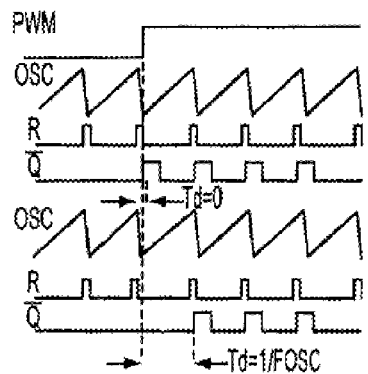
Figure 5A:
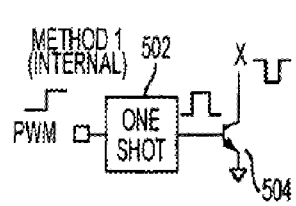
Figure 5B:
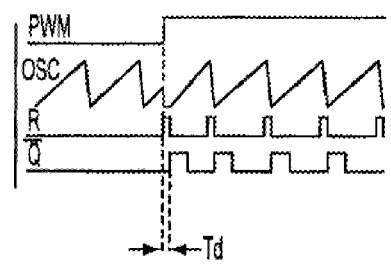
Figure 6A:
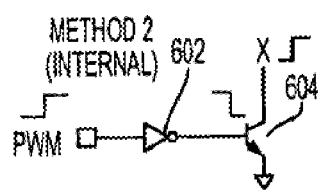
Figure 6B:
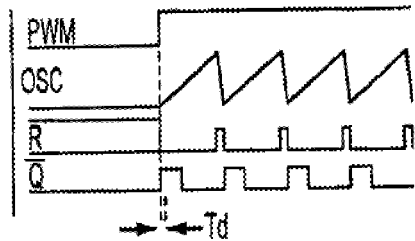
Figure 7A:
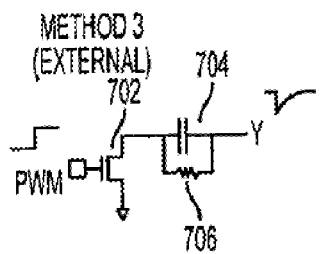
Figure 7B:
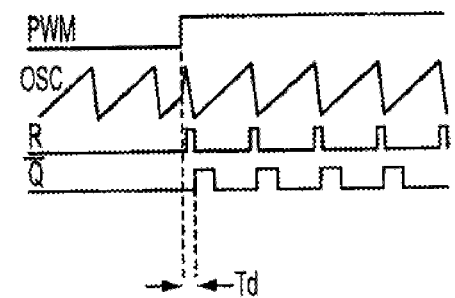

The exemplary embodiment in FIG. 7A illustrates an external dimming control technique for the LED driving circuit 10. A synchronizing circuit external with respect to the LED driver chip may include a MOSFET transistor 702 connected using a capacitor 704 to a timing resistor 706 that may be provided in the LED driver. For example, the timing resistor 706 may support operation of the oscillator. An external PWM dimming control signal may drive the MOSFET transistor producing a pulse at the timing resistor 706 coupled to the node Y shown in FIG. 3. This pulse causes extra current in the oscillator to charge the oscillator ramp quickly past its level achieved at the end of the oscillation cycle (FIG. 7B). As a result, the latch 20 is quickly reset by a signal at its R input allowing the power switch 22 to turn on. The delay Td will be minimal and defined by the oscillator ramp charging delay. Its variation also will be minimal.

Hence, the dimming control technique of the present disclosure provides synchronization of the oscillation signal to the PWM dimming control signal. Therefore, the power switch 22 turns on in synchronization with the PWM dimming control signal. As a result, the delay time Td may be minimized to increase the maximum PWM dimming ratio. Also, variation of the delay time Td may be minimized to avoid LED flicker.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for driving a light-emitting diode (LED), comprising:
   a switching regulator for providing power supply to drive the LED, the switching regulator including a switching circuit;
   an oscillator for providing an oscillation signal to control switching of the switching circuit;
   a dimming control input adapted to be supplied with a pulse-width modulation (PWM) dimming control signal to provide dimming control of the LED, the dimming control input being configured to apply the PWM dimming control signal to control switching of the switching circuit, and
   a synchronizing circuit for synchronizing the oscillation signal to the PWM dimming control signal.

2. The system of claim 1, wherein the synchronizing circuit is configured to turn on the switching circuit in synchronization with the PWM dimming control signal.

3. The system of claim 2, wherein the synchronizing circuit is configured to turn on the switching circuit in synchronization with an active edge of the PWM dimming control signal.

4. The system of claim 1, further comprising a latch having a control input controlled by the oscillator to turn on the switching circuit.

5. The system of claim 4, wherein the switching regulator and the oscillator are provided on a LED driver chip.

6. The system of claim 5, wherein the synchronizing circuit is internal with respect to the LED driver chip.

7. The system of claim 6, wherein the synchronizing circuit includes a one-shot circuit controlled by the PWM dimming control signal.

8. The system of claim 7, wherein the one-shot circuit is configured to produce an output signal for controlling the control input of the latch.

9. The system of claim 6, wherein the synchronizing circuit is configured to hold the control input of the latch at a first level during an inactive portion of the PWM dimming control signal, and to allow the control input to go to a second level causing the switching circuit to turn on in response to an active edge of the PWM dimming control signal.

10. The system of claim 5, wherein the synchronizing circuit is external with respect to the LED driver chip.

11. The system of claim 10, wherein the synchronizing circuit is configured to control the oscillator.

12. The system of claim 11, wherein the synchronizing circuit includes a capacitive element for applying the PWM signal to a timing resistor supporting operations of the oscillator.

13. A method of LED dimming control to control dimming of a LED driven by a switching regulator having a switching circuit, the method comprising the steps of:
   controlling switching of the switching circuit by an oscillation signal produced by an oscillator,
   applying a PWM dimming control signal to control dimming of the LED, the PWM dimming control signal being applied so as to control switching of the switching circuit, and
   synchronizing the oscillator to the PWM dimming control signal.

14. The method of claim 13, wherein switching of the switching circuit is synchronized to an edge of the PWM dimming control signal.

* * * * *

UNITED STATES PATENT AND TRADEMARK OFFICE
CERTIFICATE OF CORRECTION

PATENT NO.        : 7,321,203 B2
APPLICATION NO.   : 11/373266
DATED             : January 22, 2008
INVENTOR(S)       : Mark W. Marosek It is certified that error appears in the above-identified patent and that said Letters Patent is hereby corrected as shown below:

Please replace drawing sheets 3 of 4 and 4 of 4 with the corrected drawing sheets attached Signed and Sealed this Tenth Day of June, 2008

JON W. DUDAS
*Director of the United States Patent and Trademark Office*